United States Patent [19]

Debesis

[11] Patent Number: 5,061,025
[45] Date of Patent: * Oct. 29, 1991

[54] HOLOGON SCANNER WITH BEAM SHAPING STATIONARY DIFFRACTION GRATING

[75] Inventor: John R. Debesis, Penfield, N.Y.

[73] Assignee: Eastman Kodak Company, Rochester, N.Y.

[ * ] Notice: The portion of the term of this patent subsequent to Jul. 10, 2007 has been disclaimed.

[21] Appl. No.: 508,617

[22] Filed: Apr. 13, 1990

[51] Int. Cl.$^5$ .............................................. G02B 27/46
[52] U.S. Cl. ...................................... 359/18; 359/569
[58] Field of Search ............................ 350/3.71, 162.2

[56] References Cited

U.S. PATENT DOCUMENTS

| 4,410,237 | 10/1983 | Veldkamp . |
| 4,707,055 | 11/1987 | Stark . |
| 4,904,034 | 2/1990 | Narayan et al. . |
| 4,940,308 | 7/1990 | Debesis ............................ 350/162.2 |

Primary Examiner—Mark Hellner
Attorney, Agent, or Firm—Dennis R. Arndt

[57] ABSTRACT

In a laser scanner of the type having beam shaping means and a stationary diffraction grating for directing the shaped beam to a hologon scanning disc, the beam shaping means is combined with the stationary diffraction grating by providing a shaped stationary diffraction grating, thereby eliminating the need for other beam shaping means prior to the shaped diffraction grating, thereby simplifying construction of the apparatus.

3 Claims, 5 Drawing Sheets

HOLOGON SCANNER WITH BEAM SHAPING STATIONARY DIFFRACTION GRATING

TECHNICAL FIELD

This invention relates to laser scanning apparatus for producing high quality images, and more particularly to such apparatus having means for shaping the scanning spot produced by such apparatus.

BACKGROUND ART

U.S. Pat. No. 4,707,055 issued Nov. 17, 1987 to Stark and U.S. Pat. application Ser. No. 84,426 filed Apr. 4, 1986 by Narayan, Roddy, Stark and Thompson (which are incorporated herein by reference) describe scanning apparatus for providing a substantially straight line scan of a laser spot having a selected shape. The scanning apparatus shown schematically in FIG. 2 includes a laser beam light source 10, such as a laser diode. The beam 12 from the laser diode 10 is collimated by collimating optics 14, and may be preshaped to a desired cross section by a beam stop 15 such as that shown in U.S. Ser. No. 211,938 filed by the present inventor on June 21, 1988 (which is incorporated herein by reference). The beam stop 15 is employed to preshape the beam due to the wide variability in the shapes of beams produced by individual laser diodes in a batch. As shown in FIG. 3, individual diodes in a batch of laser diodes produce beams A, B, and C having a variety of cross sectional shapes. The beam stop 15 is configured to produce a beam having a desired shape E that is within the range of shapes of all beams produced by the diodes in a batch. The beam 12, as shaped by beam stop 15 is incident on a stationary diffraction grating 16, which directs the shaped beam 12' to a rotating holographic beam scanner disc 18, referred to in the art as a hologon scanner. The hologon scanner disc 18 comprises a plurality of holographically produced diffraction grating facets 20 as shown in FIG. 4. As the beam scanner disc is rotated by a high speed motor 22, the diffraction grating facets 20 cause the beam to scan in a direction perpendicular to the plane of the drawing in FIG. 2. The scanned beam 12" then passes through a pair of beam shaping prisms 24 and 26 which serve as beam expanders for expanding the cross section of the beam in the cross scan direction. The expanded beam 12" then passes through an f-θ lens 28 which focuses the scanning beam onto a target such as a rotating drum 30. The beam is scanned by hologon 18 in a direction parallel to the axis 32 of the rotating drum 30 to provide a line scan of a photosensitive element 34 attached to the drum 30. A page scan of the element 34 is provided by rotation of drum 30 about axis 32. Means (not shown) are provided for modulating the output of the laser diode 10 in accordance with information contained in a stream of electronic signals. As such means are well known in the art, no further description is provided herein. For optimum exposure of the photosensitive element 34, it is desirable that the spot produced by the laser beam be narrower in the line scan direction than in the page scan direction. For large format scanning apparatus, it is also desirable that the useful duty cycle of the hologon be as large as possible, and for a high resolution scanner (i.e. a small spot at the photosensitive element 34) it is desirable that the beam at the hologon be large. These requirements dictate that the spot 12 at the hologon be narrower in the page scan direction, as shown in FIG. 4. The prisms 24 and 26 are employed to generate the desired beam shape at the photosensitive element 34.

In the scanning apparatus described above, there is a continuing effort to reduce the manufacturing cost of the apparatus by reducing the number of parts while maintaining the high resolution capabilities of the scanning apparatus.

SUMMARY OF THE INVENTION

It is therefore an object of the present invention to provide an improved hologon laser scanner of the type having means for shaping a beam of collimated light produced by the laser, and a stationary diffraction grating for directing the beam onto a hologon scanning disc.

The object is achieved according to the present invention by shaping the stationary diffraction grating in the shape of the desired beam cross section, thereby eliminating the need for other beam shaping means prior to the diffraction grating, and simplifying the construction of the apparatus.

According to a preferred embodiment of the invention, the shaped stationary diffraction grating is in the shape of an ellipse and produces a soft edged shaped spot.

According to a further feature of the invention, the shape stationary diffraction grating shapes not only the outline of the spot but the intensity distribution within the spot.

MODES OF CARRYING OUT THE INVENTION

Figure 1:
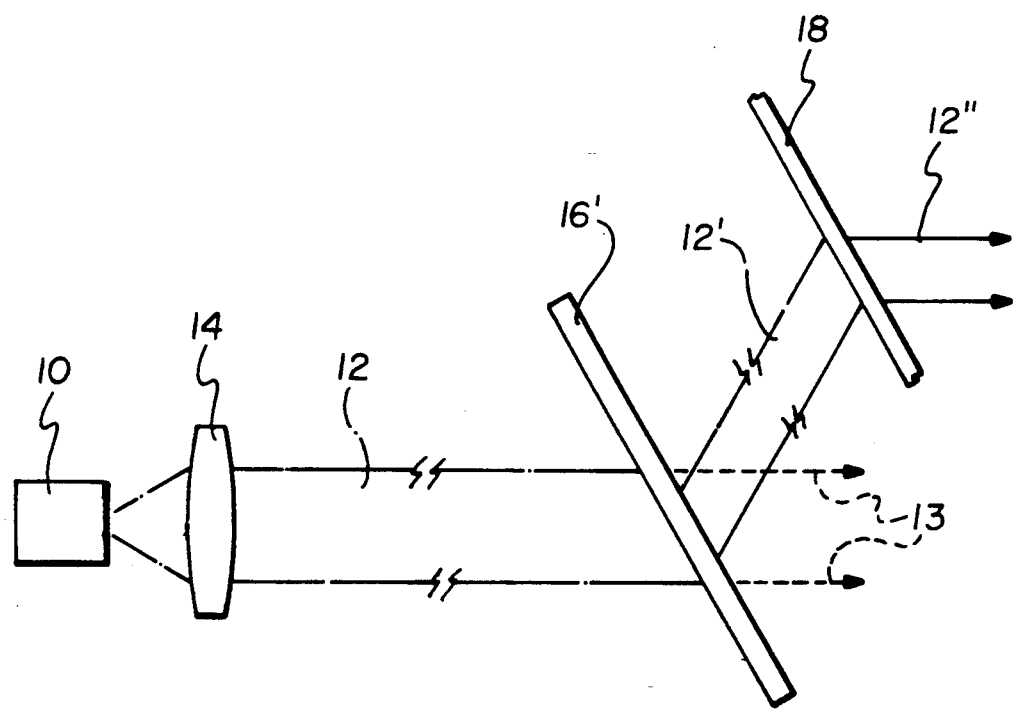
FIG. 1 is a schematic diagram showing a portion of a hologon scanning apparatus employing a shaped stationary diffraction grating according to the present invention.
Figure 2:
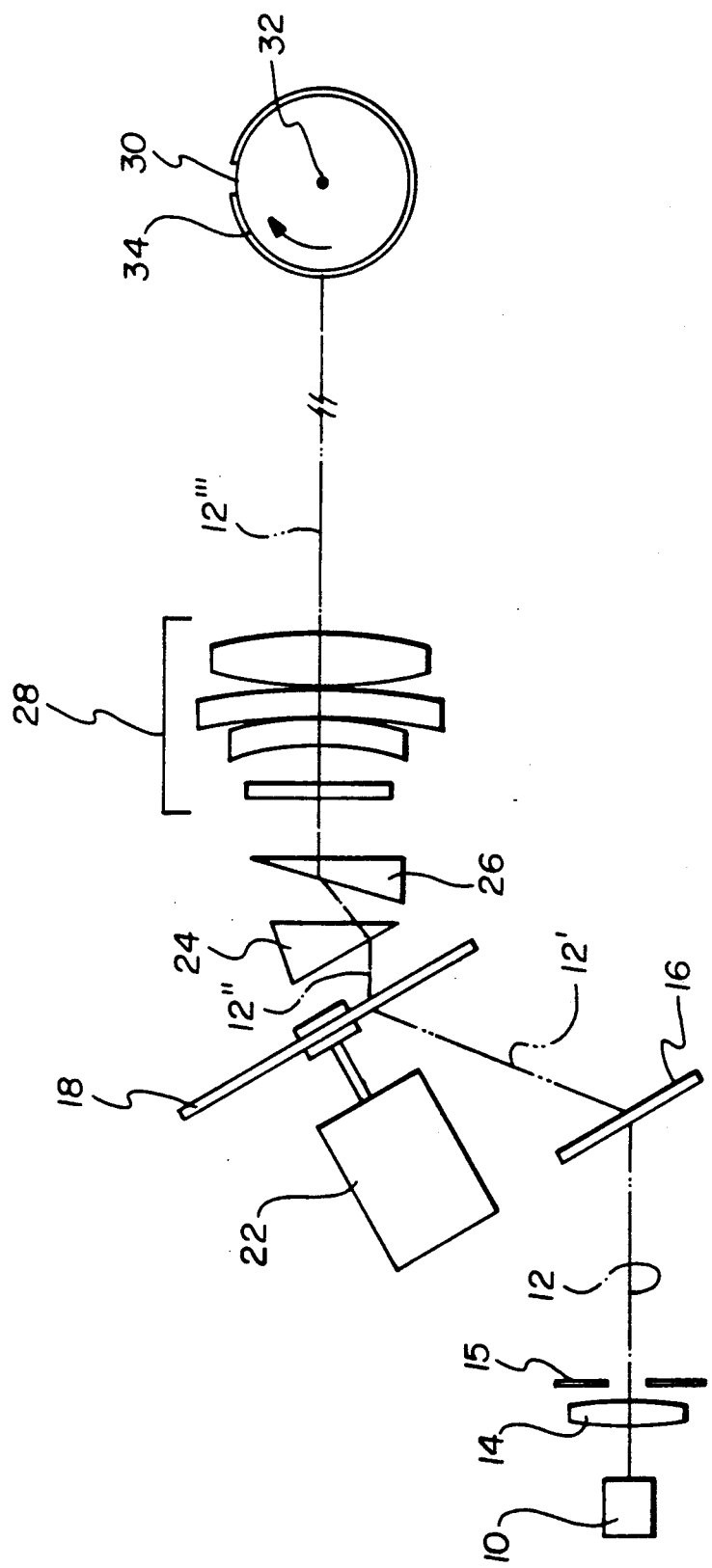
FIG. 2 is a schematic diagram showing prior art hologon laser scanning apparatus.
Figure 3:
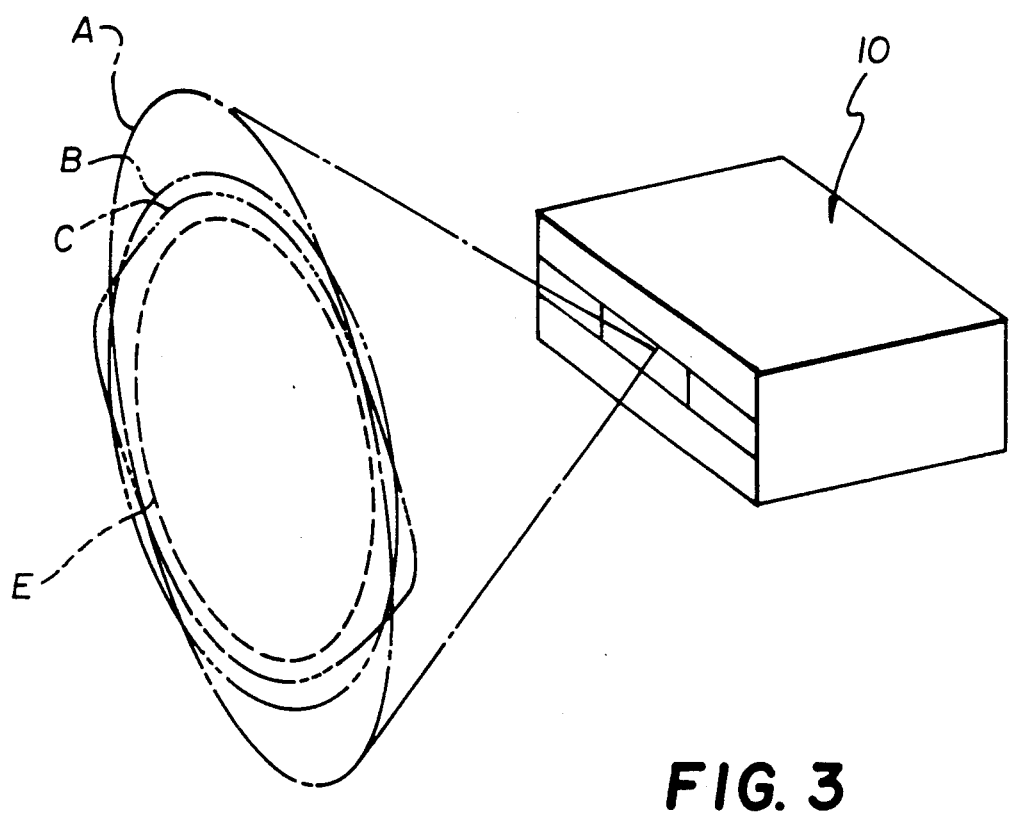
FIG. 3 is a schematic diagram useful in describing the diode lasers employed in the scanning apparatus of FIGS. 1 and 2.
Figure 4:
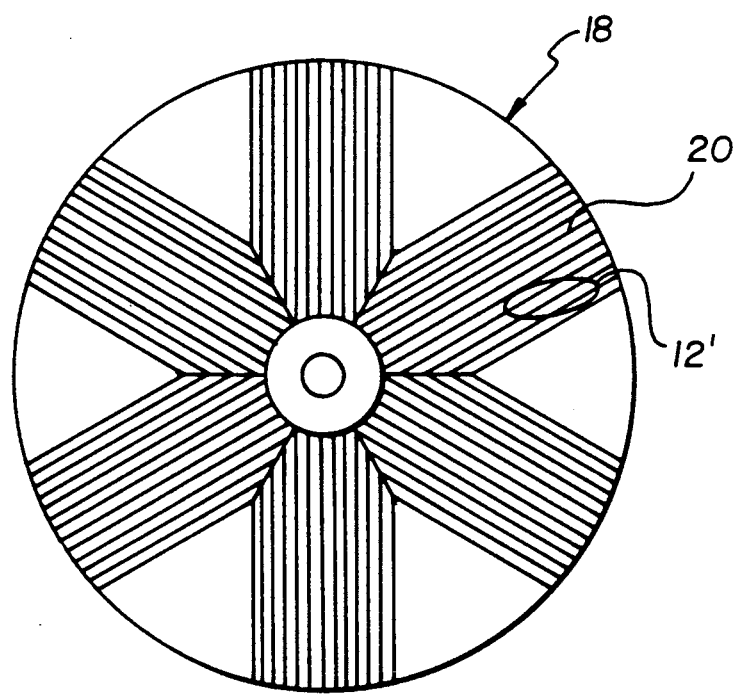
FIG. 4 is a schematic diagram showing a radial hologon scanning disc employed in the hologon laser scanners shown in FIGS. 1 and 2.

Referring to FIG. 1, a portion of the hologon laser scanning apparatus including the shaped stationary diffraction grating 16' according to the present invention is shown. Elements corresponding to the elements in the prior art scanner shown in FIG. 2 are similarly numbered. In the apparatus shown in FIG. 1, the beam shaping stop 15 has been eliminated, and its function incorporated in the shaped stationary diffraction grating 16', thereby eliminating a part and reducing the manufacturing cost of the laser scanner.

As shown in FIG. 1, the light emitted by the laser diode 10 is collimated by lens 14 into a beam 12. The beam 12 is incident on the shaped stationary diffraction grating 16', and a shaped portion of the beam 12' is diffracted onto the hologon scanner disc 18. The light from beam 12 that is not diffracted into shaped beam 12' continues in a direction out of the optical system as shown by dotted lines 13 in FIG. 1. Rotation of the hologon scanner disc 18 scans the beam 12" in the direction perpendicular to the plane of the drawing.

Figure 5:
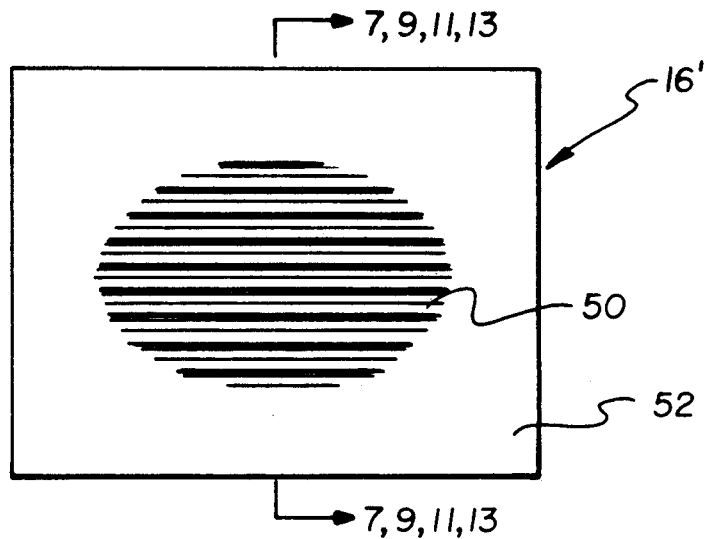
FIG. 5 is a schematic diagram illustrating a shaped stationary diffraction grating employed in a hologon laser scanner according to the present invention.

FIG. 5 shows a plan view of the shaped stationary diffraction grating 16'. The grating 16' comprises a central diffracting region 50 that is shaped in the desired shape of the beam cross section, surrounded by a non-diffracting region 52. In the example shown in FIG. 5, the central diffracting region 50 is in the shape of an ellipse, but other shapes such as circular, rectangular or tear drop shapes can be employed. Preferably, the central shaped diffraction region 50 is surrounded by soft edges wherein the diffraction efficiency of the grating reduces smoothly to zero. Alternatively, the central diffracting region 50 can have hard edges where the diffracting efficiency changes abruptly to zero.

The power and position of collimated lens 14 is chosen so that the size of the collimating beam 12 will be larger than the size of the shaped central diffracting region 50 for all laser diodes in a batch, thereby insuring that the shaped beam 12' will be fully formed.

Figure 6:
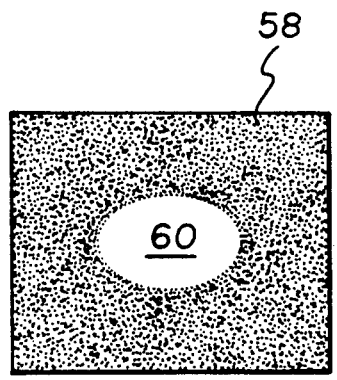
FIG. 6, 8, 10, 12, and 15 are plan views of masks employed to produce shaped diffraction grating for use in the scanning apparatus of the present invention.
Figure 7:
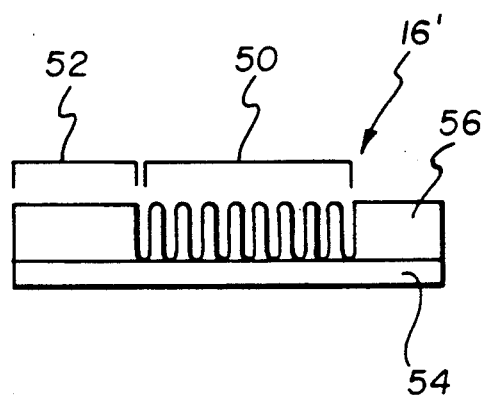
FIGS. 7, 9, 11, 13, and 16 are schematic diagrams illustrating cross sectional views of various shaped diffraction gratings created using the masks shown in FIGS. 6, 8, 10, 12, and 15 respectfully.

Referring to FIGS. 6 and 7, the shaped diffraction grating 16' is produced in the following manner. An optically transparent substrate 54 is coated with a photosensitive photoresist 56. A chrome-on-glass photomask 58, having a clear aperture 60 in the shape of the desired diffraction pattern, is placed over the photoresist coating 56. With the photomask 58 in position, an interference pattern is exposed on the photoresist by means known to those skilled in the art, so that no further description is given.

The photoresist is exposed to the interference pattern through the photomask 58. After exposure, the exposed diffraction pattern in the photomask is developed employing techniques well known to those in the art, to produce a shaped diffraction pattern corresponding to the shape of the clear area 60 in the mask 58.

As shown in the cross sectional view in FIG. 7, the diffraction grating pattern 50 is sinusoidal groove pattern in the photoresist layer 56.

Figure 8:
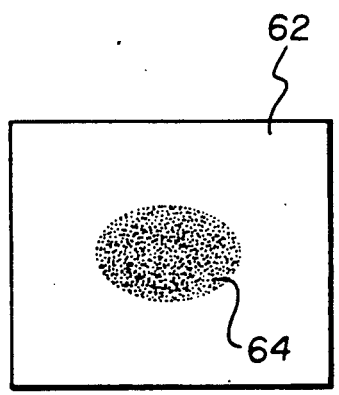
Figure 9:
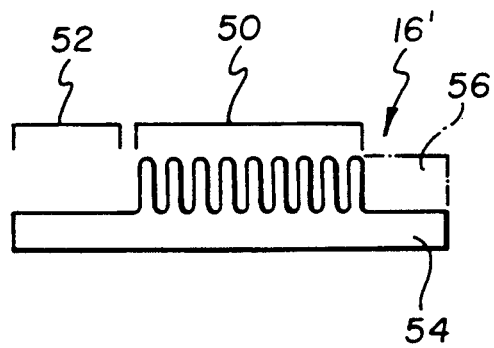

Alternatively, the shaped diffraction grating 16' may be formed as shown in FIG. 9 with the mask shown in FIG. 8 by first exposing the entire photoresist with the diffraction pattern, then placing the mask shown in FIG. 8 in contact with the photoresist and flood exposing with light. The mask 62 shown in FIG. 8 has a central opaque spot 64 in the shape of the desired laser beam cross section. When the photoresist is subsequently developed, only the diffraction pattern 50 remains on the substrate.

The shaped diffraction gratings shown in FIGS. 7 and 9 exhibit an abrupt change in diffraction efficiency at the edge of the spot. The abrupt change may give rise to further undesirable diffraction effects in the beam.

Figure 10:
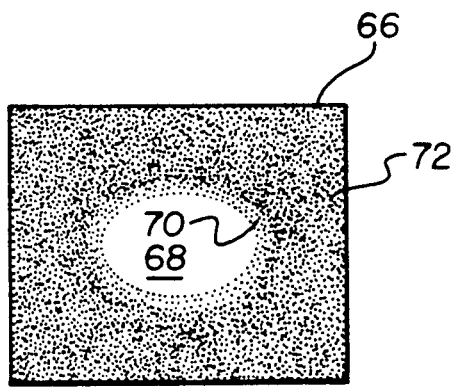
Figure 11:
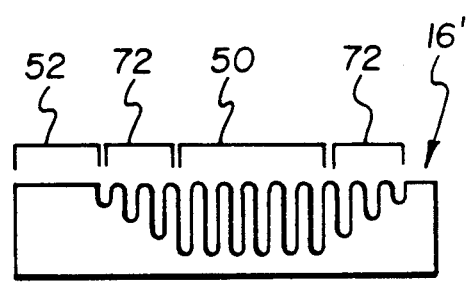

To reduce such unwanted diffraction effects, according to a preferred mode of practicing the invention, the shaped diffraction grating exhibits smooth transition between high and low diffraction efficiency at the edge of the grating. A mask for making such a soft edge diffraction grating is shown in FIG. 10. The photomask 66 has a shaped central region 60 of maximum transmissions surrounded by a narrow region 70 of increasing optical density, to a region of maximum opacity 72. Thus, there is a gradient in optical density between the clear central region 68 and the surrounding opaque region 72. Such a photomask is made by coating a thin film of chrome or other opaque material on a glass substrate. The gradient is created by using mechanical means to selectively remove the coating to provide the gradient in optical density. The photomask 66 is employed as described with reference to FIGS. 6 and 7 above to produce the soft edged grating shown in FIG. 11. As shown in FIG. 11, a high diffraction efficiency central region 50 is surrounded by a region 72 of gradually decreasing diffraction efficiency.

Figure 12:
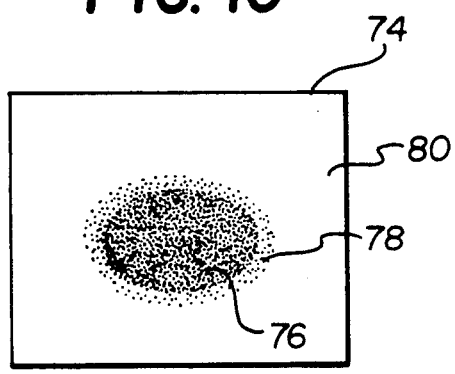
Figure 13:
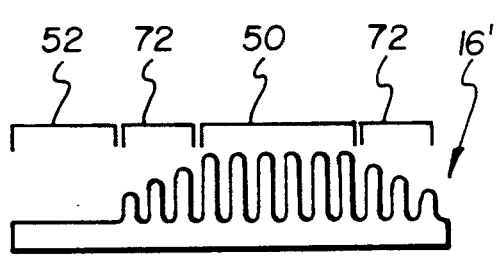

FIG. 12 illustrates a mask 74 for creating a soft edged shaped diffraction grating analogous to the method described above with respect to FIGS. 8 and 9. As seen in FIG. 12, the mask 74 comprises a central opaque region 76, surrounded by a region 78 of decreasing optical density, to a transparent region 80. A cross section of the resulting grating 16' is shown in FIG. 13.

Figure 14:
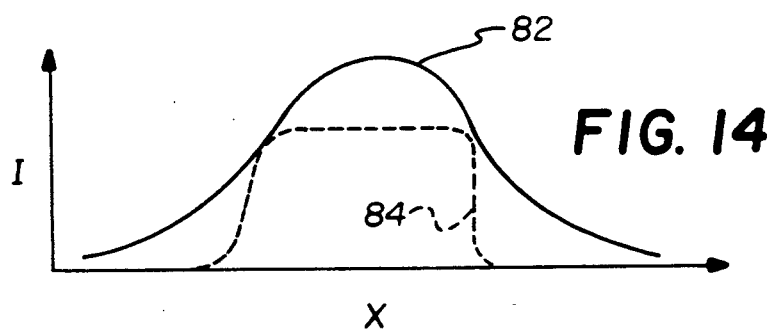
FIG. 14 is a graph illustrating a cross section of the intensity of a spot modulated by the shaped diffraction grating of FIG. 16.

The shaped diffraction grating of the present invention can be employed to shape not only the outline of the beam, but also the intensity distribution of the beam. This is accomplished by varying the diffraction efficiency of the grating within the central region of the spot. For example, in FIG. 14 curve 82 shows a typical gaussion intensity distribution across a beam from a laser diode. It is frequently desirable not only to truncate the tails of the distribution to shape the beam, but also to equalize the intensity across the beam, as shown by the dashed curve 84 in FIG. 14. A shaped diffraction grating for producing such an intensity distribution from a gaussion distribution is characterized by having a reduced diffraction efficiency at the center of the grating, to thereby reduce the intensity of the beam at the center of the spot. The shaped diffraction grating having reduced diffraction efficiency at the center of the spot can be produced by employing the mask 86 shown in FIG. 15.

Figure 15:
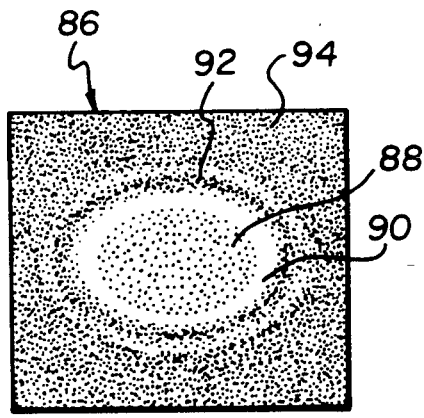

As shown in FIG. 15, the mask 86 includes a central partially transparent portion 88 surrounded by a full transparent portion 90. The partially transparent portion 88 is configured to vary in optical density continuously from center to edge. The fully transparent portion 90 may be further surrounded by a gradient region 92 such as shown in FIG. 10 to produce a soft edged spot. The remainder of the mask is opaque region 94.

Figure 16:
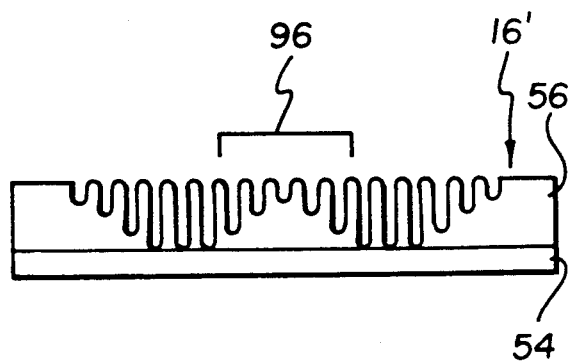

FIG. 16 shows a cross section of the resulting shaped diffraction grating having a central portion 96 with reduced diffraction efficiency.

Of course, a mask similar to that shown in FIG. 12 having partial transparency in the center could be employed to produce a shaped grating like that in FIG. 13 having reduced efficiency in the center.

INDUSTRIAL APPLICABILITY AND ADVANTAGES

The scanner of the present invention is useful for making high resolution graphic images. The scanner is advantageous in that fewer parts are employed than the prior art scanner while accomplishing the same functions, thereby achieving manufacturing economy.

I claim:

1. Scanning apparatus for scanning a radiation spot along a line at a target, comprising:
   a) a source of coherent radiation;

b) a hologon mounted for rotation about an axis to scan a beam of radiation incident thereon;

c) means for forming radiation from the source into a collimated beam;

d) a shaped stationary diffraction grating for receiving the collimated beam, and directing a portion of the beam having a desired shape onto the hologon at a predetermined angle the shaped diffraction grating having a central portion having a high diffraction efficiency, surrounded by a peripheral portion having a reduced diffraction efficiency;

e) a target station for receiving the scanned beam; and f) an $f\theta$ lens located between the target station and the hologon for focusing the shaped beam to a spot at the target station.

2. The scanning apparatus claimed in claim 1, wherein the shape of the diffraction grating is elliptical.

3. The scanning apparatus claimed in claim 1, wherein the shaped diffraction grating shapes both the beam outline and the intensity distribution of the beam.

* * * * *